(12) United States Patent
Singla (10) Patent No.: US 11,243,563 B2
(45) Date of Patent: Feb. 8, 2022

(54) DEVICE FORCE CONTROL (71) Applicant: Microsoft Technology Licensing, LLC, Redmond, WA (US)

(72) Inventor: Aseem Singla, Bothell, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 16/664,377

(22) Filed: Oct. 25, 2019

(65) Prior Publication Data
US 2021/0125762 A1 Apr. 29, 2021

(51) Int. Cl.
G06F 1/16 (2006.01)
E05B 65/00 (2006.01)

(52) U.S. Cl.
CPC ........ G06F 1/1616 (2013.01); E05B 65/0067 (2013.01)

(58) Field of Classification Search
CPC .... G06F 1/1616; G06F 1/1679; G06F 1/1618; H04M 1/0214; E05B 65/0067
See application file for complete search history.

(56) References Cited

U.S. PATENT DOCUMENTS

| | | | |
|---|---|---|---|
| 5,509,176 A | 4/1996 | Karl | |
| 6,507,485 B2 | 1/2003 | Zadesky | |
| 8,359,710 B2 | 1/2013 | Degner et al. | |
| 9,429,986 B2 | 8/2016 | Xia et al. | |
| 9,541,954 B1 * | 1/2017 | Lee | G06F 1/1618 |
| 9,785,198 B2 | 10/2017 | Grinstead et al. | |
| 10,162,381 B2 | 12/2018 | Hsu et al. | |
| 10,324,499 B1 | 6/2019 | Kaya et al. | |
| 2009/0103261 A1 | 4/2009 | Shih | |
| 2010/0270817 A1 | 10/2010 | Yu | |
| 2013/0329359 A1 * | 12/2013 | Andre | G06F 1/1616 361/679.55 |

OTHER PUBLICATIONS

"International Search Report and Written Opinion Issued in PCT Application No. PCT/US20/055871", dated Feb. 12, 2021, 12 pages.

* cited by examiner

Primary Examiner — James Wu
(74) Attorney, Agent, or Firm — Rainier Patents, P.S.

(57) ABSTRACT

The description relates to devices and progressive forces between device portions. In one example, an extent of compression of a compressible material component can affect magnetic attraction between the device portions.

18 Claims, 6 Drawing Sheets

DEVICE FORCE CONTROL

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced.

DESCRIPTION

The present concepts relate to devices and to providing a progressive force between device portions over the life of the device. For instance, magnetic forces can be used to bias, and thereby hold, two device portions together. However, over the life of the device, the desired magnetic force may change because of other device changes, such as decreased hinge torque associated with rotation of the device portions. The present concepts can provide a progressive magnetic force via decreasing dimensions of a compressible material associated with the magnets. In one example the compressible material can be a solid foam which tends to set (e.g. compress) over time. This compression can be leveraged to tune the magnetic force over time by changing the distance between the magnets.

Figure 1A:
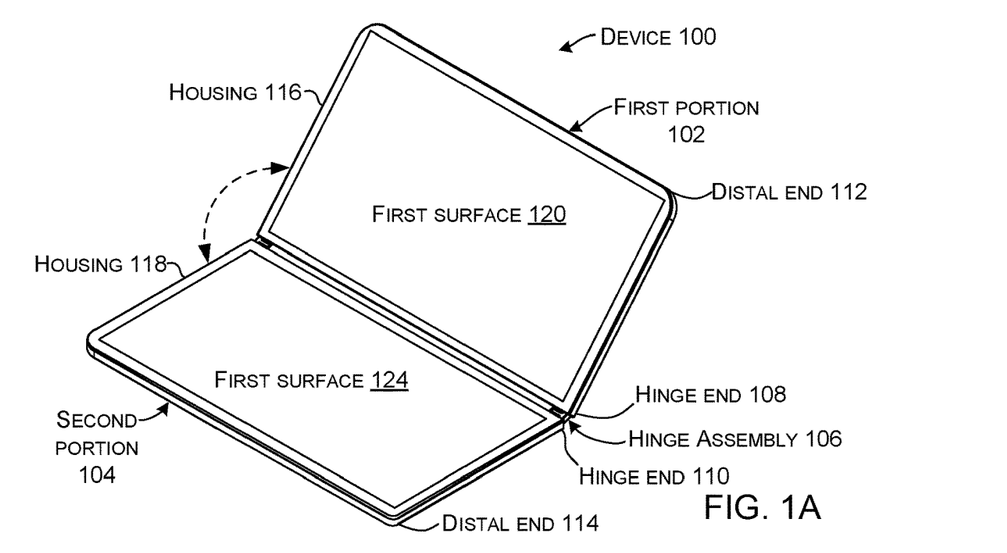
FIGS. 1A-1C, 2A and 2B are perspective views of example devices that can employ force control implementations in accordance with the present concepts.
Figure 1B:
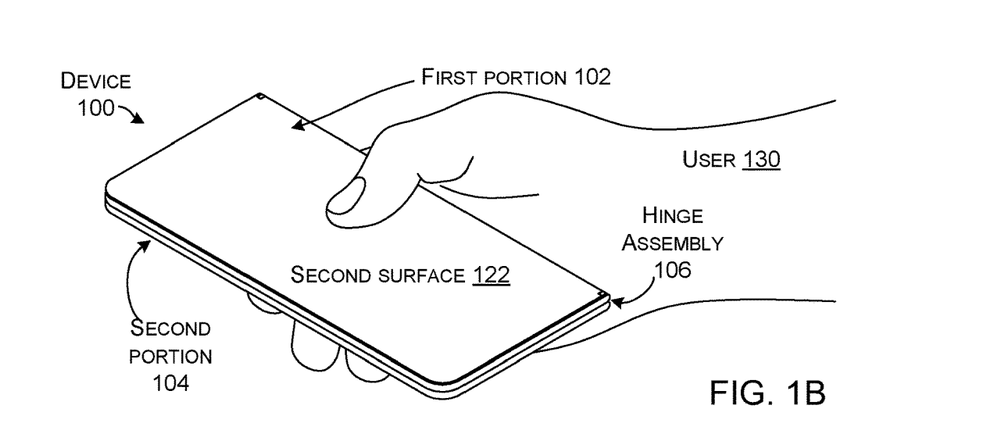
Figure 1C:
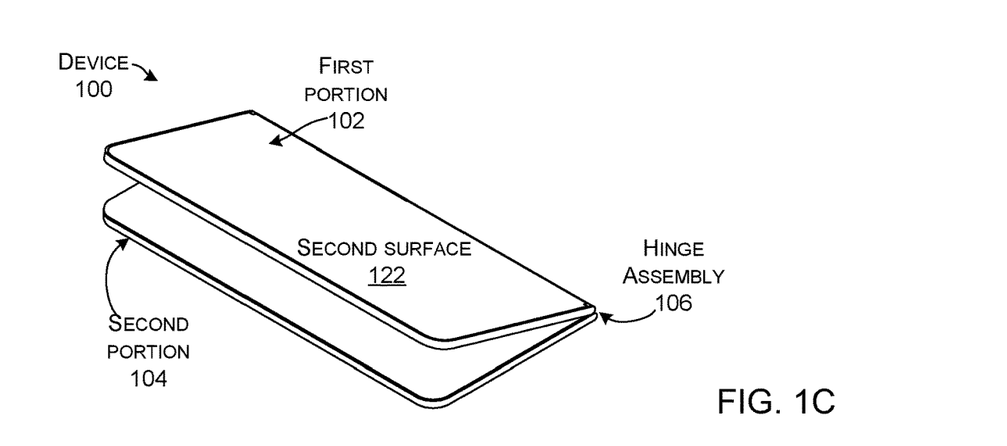

FIGS. 1A-1C collectively show an example device 100. In this example, device 100 is manifest as a foldable tablet or foldable smartphone type device that includes a first portion 102 and a second portion 104. The first and second portions 102 and 104 can be rotatably coupled or secured by a hinge assembly 106 at their respective hinge ends 108 and 110. The portions 102 and 104 can extend from their hinge ends 108 and 110 to distal ends 112 and 114 (e.g., ends away from the hinge assembly 106). The first portion 102 can include a housing 116 and the second portion 104 can include a housing 118. The housings 116 and 118 can contribute structurally to the device. For instance, hinge assembly 106 can be connected to the housings 116 and 118. In this example, the first portion 102 can define generally opposing first and second surfaces 120 and 122. Similarly, the second portion 104 can define generally opposing first and second surfaces 124 and 126.

FIG. 1A shows the device in an example open orientation where the first and second portions 102 and 104 are rotated away from each other to about 130 degrees, for instance.

FIG. 1B shows that a user 130 can impart a force on the device to rotate the first and second portions toward one another until first surface 120 is contacting first surface 124 (e.g., the first and second portions 102 and 104 are closed against one another). In one example, the user may close the device so he/she can put the device in his/her pocket or purse. However, FIG. 1C shows that the device may undesirably spring slightly back open from the closed position.

Such springing back open can be caused by various factors. In one such case, hinge torque from the hinge assembly may cause the springing back. For instance, the hinge assembly may include a hinge pin or hinge shaft that is positioned in a hinge bore. The hinge pin may be designed slightly oversize to create a friction hinge so the device will hold whatever open orientation the user puts it in. However, when the user gets to the closed orientation, the friction forces (e.g., hinge torque) can cause the first and second portions 102 and 104 to rotate back a few degrees.

Note that the hinge torque causing the spring back may change over the life of the device. For instance, in the example case of the friction hinge, hinge torque of the hinge may decrease over time, such as due to component wear (e.g., the hinge bore gets larger and/or the hinge pin gets smaller). As such, when the device is new, the hinge torque created by the hinge assembly may be 'X' units, whereas after the device has been opened and closed hundreds of times the hinge torque can be 'Y' units, where Y is less than X. A profile of the rotational friction including the hinge torque can be calculated and/or measured on a test device.

In other cases, the friction hinge's hinge torque may increase over time. As such, when the device is new, the spring back hinge torque created by the hinge assembly may be 'X' units, whereas after the device has been opened and closed hundreds of times the hinge torque can be 'Y' units, where Y is greater than X. As mentioned above, the profile of the hinge torque including the spring back force can be calculated and/or measured on a test device. The discussion below explains how the present concepts can address these changing profiles to maintain specified characteristics of the device.

Figure 2A:
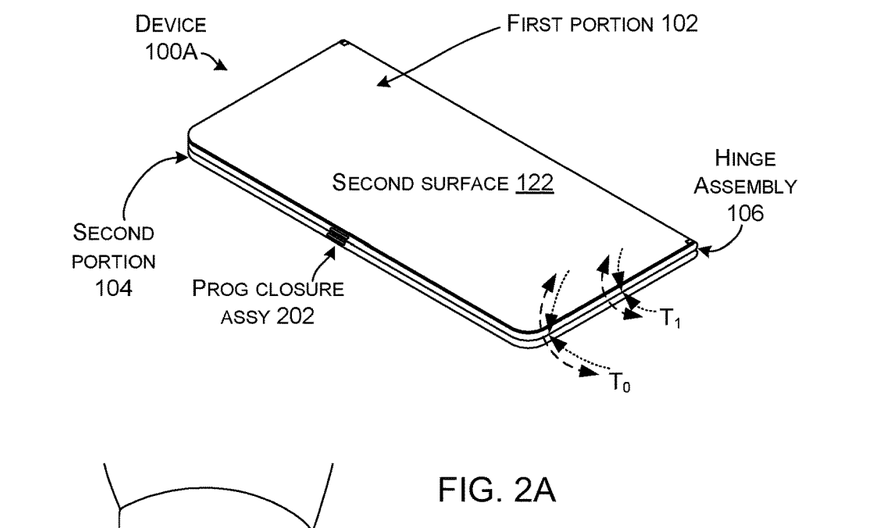
Figure 2B:
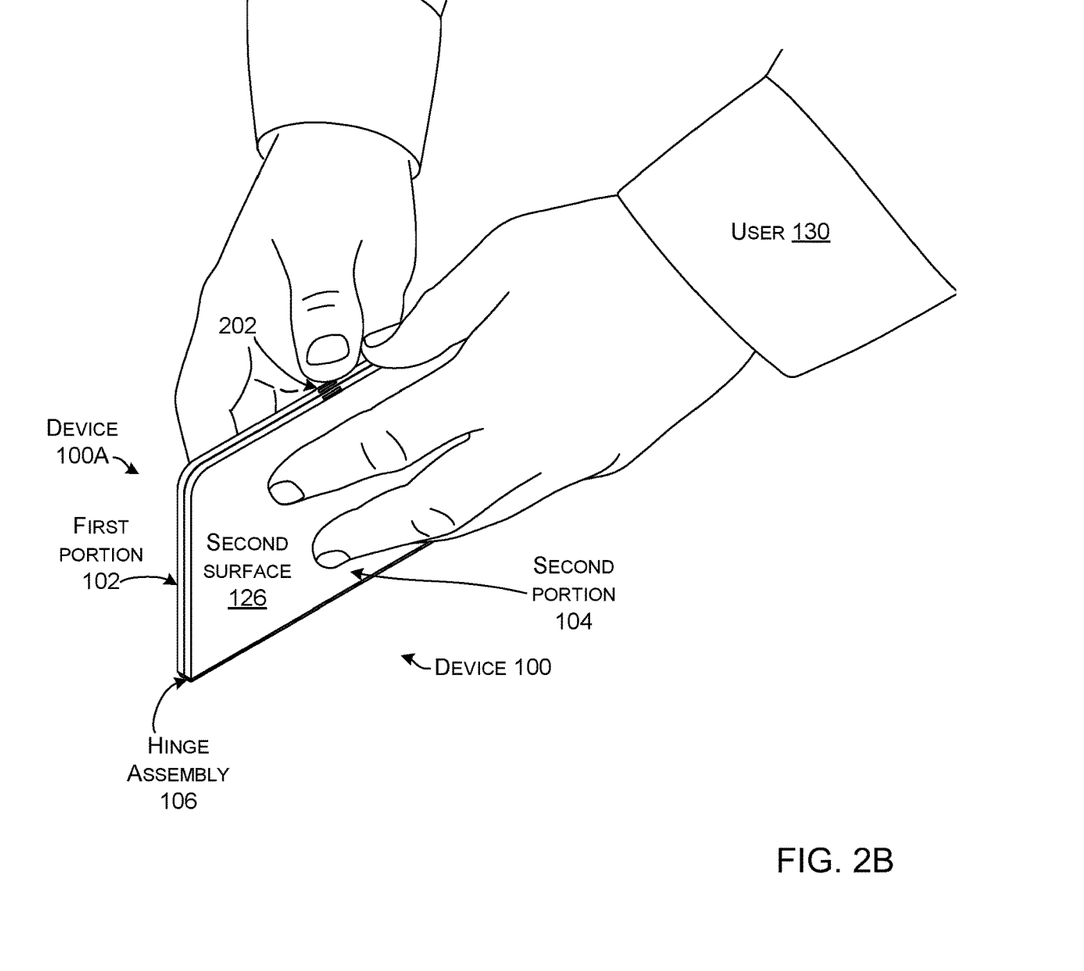

FIGS. 2A and 2B collectively show another device 100A. Device 100A can include a progressive closure assembly 202. (The suffix 'A' relative to device 100A indicates that some aspects of this device 100A can be different from those of device 100 described above relative to FIGS. 1A-1C. Elements introduced above relative to FIGS. 1A-1C are not re-introduced here for sake of brevity).

The progressive closure assembly 202 can create attractive forces between the first and second portions 102 and 104 that can counter the hinge torque mentioned above relative to FIG. 1C and prevent spring back (e.g., maintain the first and second portions in a closed orientation when the user closes them). Further, the progressive closure assembly 202 can be designed to have a force profile that changes over time. In this case, the attractive forces imparted on the first and second portions 102 and 104 by the progressive closure assembly 202 can decrease over time/use. (Other examples are described below where the attractive forces increase over time/use).

This force change aspect can be seen in FIG. 2A, which shows hinge torque as dashed arrows and magnetic forces of the progressive closure assembly 202 as dotted arrows. When the device is new (e.g., time zero ($T_0$)), the magnetic forces are slightly greater than the hinge torque. At a subsequent point in the life of the device indicated as time one ($T_1$), the hinge torque has decreased. The magnetic forces have also decreased so that the magnetic forces remain slightly greater than the hinge torque.

FIG. 2B shows an example where the force of the progressive closure assembly 202 can decrease to balance the changing force profile (e.g., hinge torque) of the hinge assembly 106 during the life of the device 100A. These matching force profiles allow the device to stay closed when the first and second portions are closed by the user, but the user can easily open the first and second portions when desired. Without the progressive force profile of the progressive closure assembly 202, a device that maintained the closed orientation when new would get progressively harder to open as the hinge torque decreased over time and/or use, but the attractive forces did not. However, the progressive force profile generated by the progressive closure assembly 202 can produce a nearly uniform user experience when opening the device over its life.

Figure 3A:
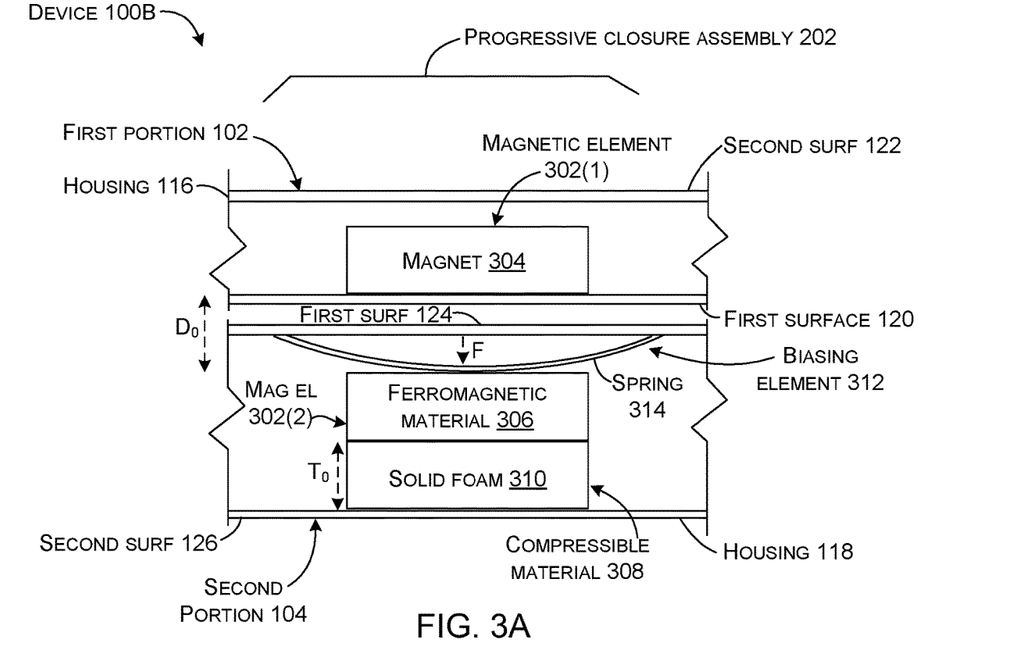
FIGS. 3A, 3B, 4A, 4B, 5A, 5B, 6A and 6B are elevational views of example devices that can employ force control implementations in accordance with the present concepts.
Figure 3B:
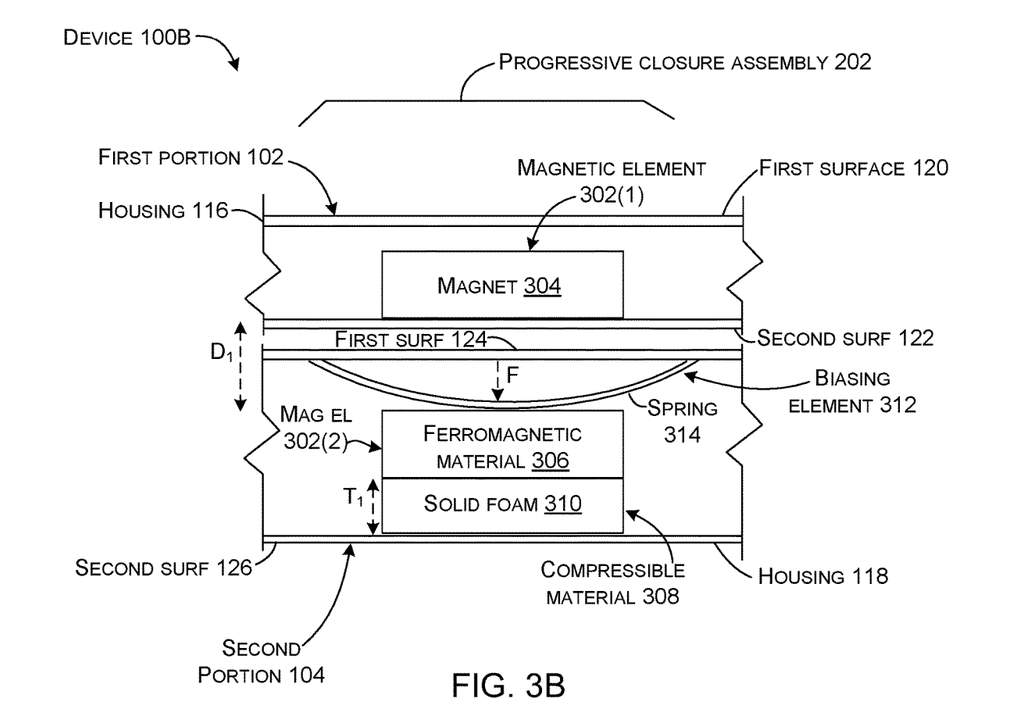

FIGS. 3A and 3B collectively show portions of another example device 100B. (The suffix 'B' relative to device 100B indicates that some aspects of this device 100B can be different from those of devices 100 and/or 100A described above relative to FIGS. 1A-2B. Elements introduced above relative to FIGS. 1A-2B are not re-introduced here for sake of brevity). Device 100B includes example progressive closure assembly 202.

In this case, progressive closure assembly 202 includes magnetic element 302(1) positioned in housing 116 proximate to the first surface 120 of the first portion 102. In this example, the magnetic element 302(1) is manifest as a magnet 304. Magnetic element 302(2) is manifest as ferromagnetic material 306, such as iron or steel that is positioned in second portion 104.

The progressive closure assembly 202 can also include a compressible material 308, that is manifest as solid foam 310. An example solid foam that could be employed is Singleton Polyplate Melamine Foam MF series. This solid foam is made of melamine resin which has compression set up to 45%. This is an example of a suitable solid foam and other solid foams are contemplated. The progressive closure assembly 202 can also include a biasing element 312, that in this case is manifest as a leaf spring 314. In this example configuration, the solid foam 310 can be secured to the housing 118 proximate to the second surface 126. The solid foam 310 can also be secured to the ferromagnetic material 306. The leaf spring 314 is positioned between the housing (at first surface 124) and the ferromagnetic material 306. The leaf spring can create a downward bias or force F on the ferromagnetic material 306, which can transfer the bias to the solid foam 310. Stated another way, the leaf spring can urge or push the ferromagnetic material 306 against the solid foam 310. The solid foam is captive due to the housing 118 and is thus subjected to compressive forces.

Various types of compressible material 308 and/or biasing elements 312 can be employed. Several examples are described above and below. When considering potential combinations of compressible material 308 and biasing elements 312, the biasing element should have significantly lower compression set properties compared to the compressible material 308 (e.g., the biasing element should remain resilient while the compressible material compresses). For instance, metal spring materials, such as various steels tend to have relatively low compression sets and can be used in combination with a range of different compressible materials, such as various compressible polymers including foams.

FIG. 3A shows the device 100B in a new condition where solid foam 310 has a thickness $T_0$. This thickness causes a distance $D_0$ between the ferromagnetic material 306 of the second portion 104 and the magnet 304 of the first portion 102. Magnetic forces are a product of the distance between the magnetic elements 302 (e.g., the magnet 304 and the ferromagnetic material 306).

FIG. 3B shows the device 100B at a subsequent point in its life. At this point, the bias from spring 314 (as well as time and gravity) has caused compression of the solid foam 310, which now has a thickness $T_1$ that is less than thickness $T_0$ when the device 100 was new. This decreased thickness causes an increased distance $D_1$ between the ferromagnetic material 306 of the second portion 104 and the magnet 304 of the first portion 102. As mentioned above, magnetic forces are a product of the distance between the magnetic elements 302 (e.g., the magnet 304 and the ferromagnetic material 306). Thus, the increased distance results in decreased magnetic attractive forces between the first and second portions 102 and 104.

Figure 4A:
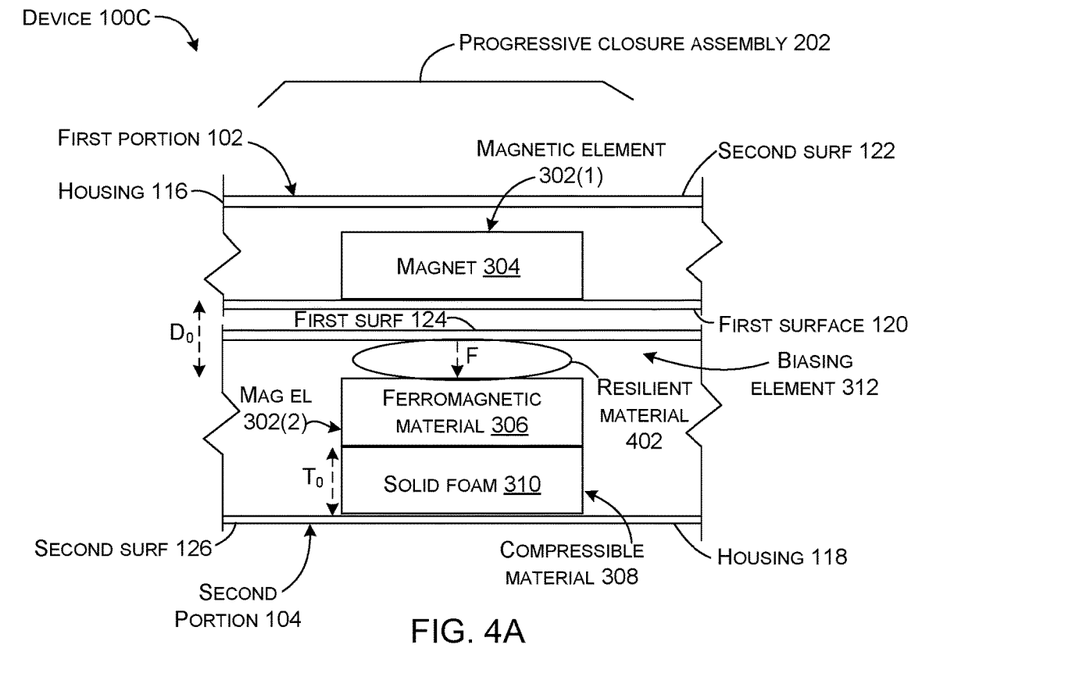
Figure 4B:
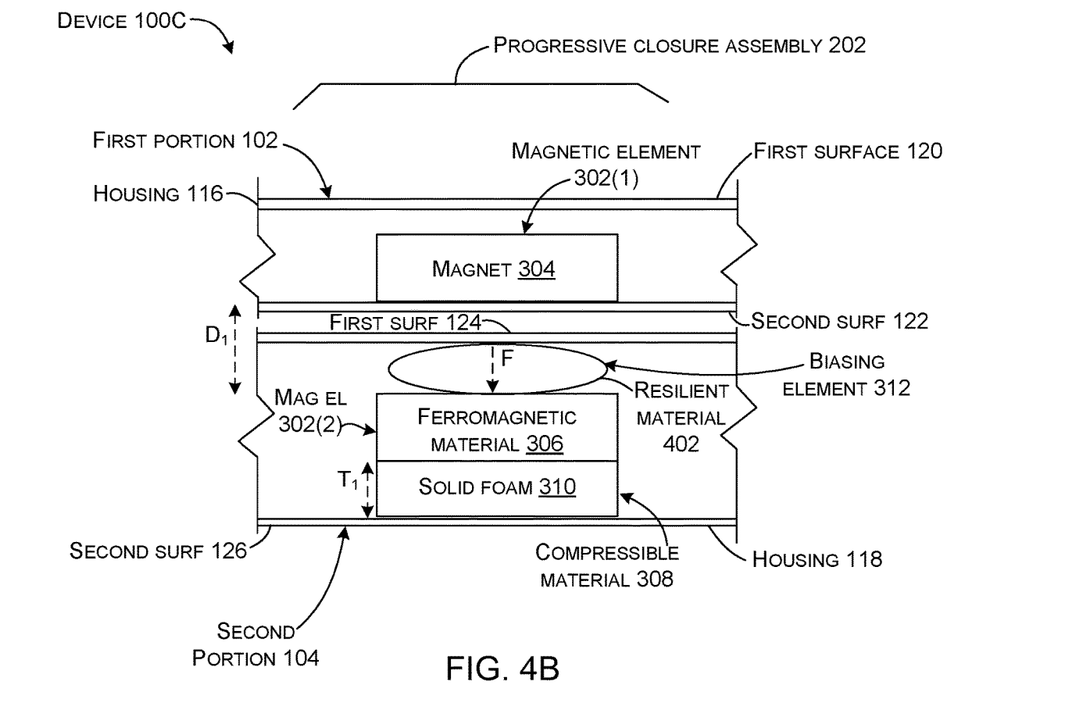

FIGS. 4A and 4B collectively show portions of another example device 100C. (The suffix 'C' relative to device 100C indicates that some aspects of this device 100C can be different from those of devices 100, 100A, and/or 100B described above relative to FIGS. 1A-3B. Elements introduced above relative to FIGS. 1A-3B are not re-introduced here for sake of brevity).

Example device 100C is similar to device 100B. However, in this case, the biasing element 312 is manifest as a resilient material 402. The resilient material 402 can be installed in a compressed state such that the resilient material exerts biasing force F that contributes to the compression of solid foam 310 over time. This compression increases distance D, which causes the magnetic attraction forces to decrease as a result of the increasing distance.

Figure 5A:
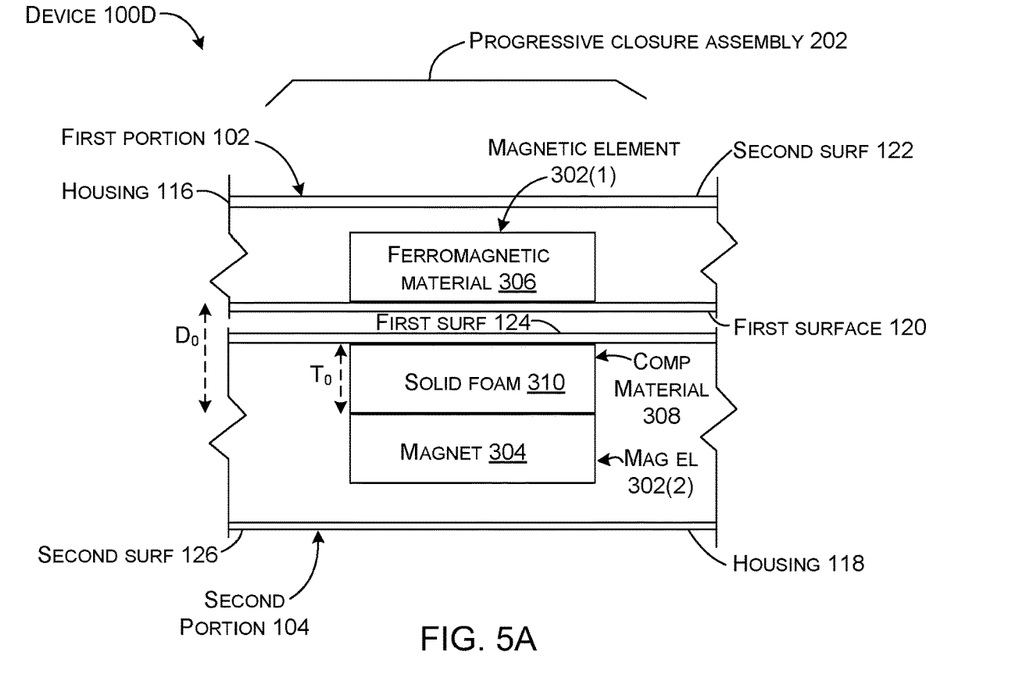
Figure 5B:
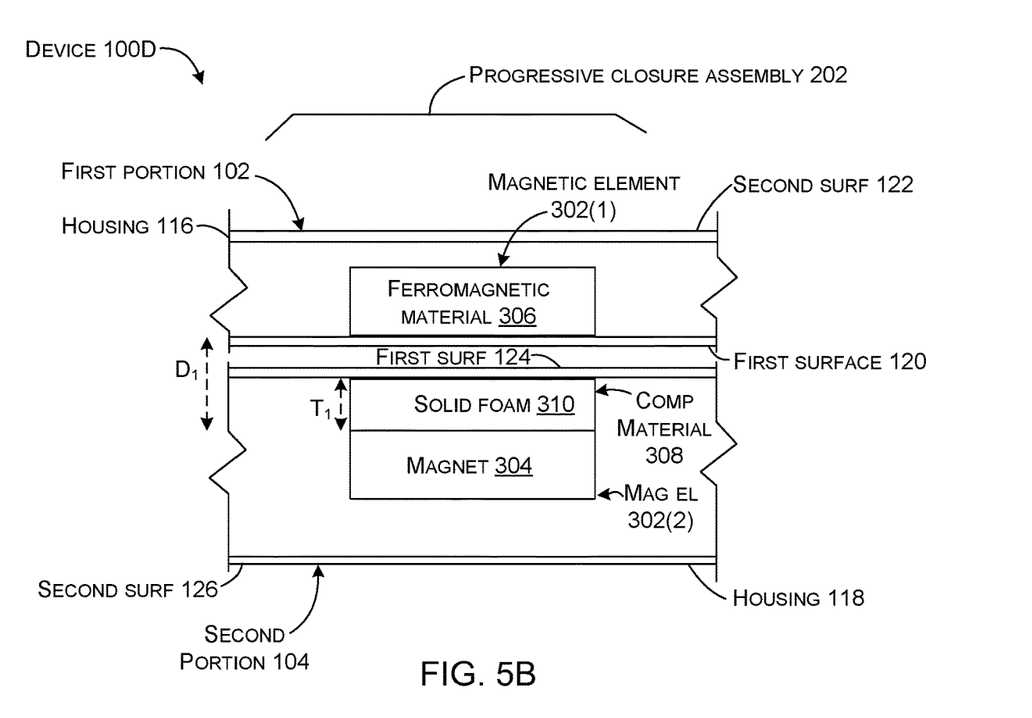

FIGS. 5A and 5B collectively show portions of another example device 100D. (The suffix 'D' relative to device 100D indicates that some aspects of this device 100D can be different from those of devices 100, 100A, 100B, and/or 100C described above relative to FIGS. 1A-4B. Elements introduced above relative to FIGS. 1A-4B are not re-introduced here for sake of brevity).

In this case, progressive closure assembly 202 can provide increasing magnetic closing forces as the device ages. In this example configuration, the progressive closure assembly 202 includes magnetic element 302(1) positioned in housing 116 proximate to the first surface 120 of the first portion 102. In this case, the magnetic element 302(1) is manifest as a ferromagnetic material 306. Magnetic element 302(2) is manifest as magnet 304 that is positioned in second portion 104.

The progressive closure assembly 202 can also include a compressible material 308 that is manifest as solid foam 310 interposed between the magnetic elements 302. An example solid foam that can be employed is Singleton Polyplate PF-S4 series is Microcellular polyurethane foam which has about 4% compression set. Another example solid foam that can be employed is Singleton Polyplate PF-TS series. This latter foam series includes thin foam adhesives which have 5% compression. These are examples of suitable solid foams and other solid foams are contemplated.

In this example configuration, the solid foam 310 can be secured to the housing 118 proximate to the first surface 124. The solid foam 310 can also be secured to the magnet 304. In the closed orientation (and when approaching the closed orientation), the magnetic attraction force is related to the distance Do between the ferromagnetic material 306 and the magnet 304. As illustrated in FIG. 5A, when the device 100 is in the closed orientation, the magnetic attraction between the magnet 304 and the ferromagnetic material 306 can act as a compressive force on solid foam 310.

FIG. 5B shows device 100C in the closed orientation at a subsequent point in the device's life. At this point, the magnetic attraction forces have contributed to compression of the solid foam 310 as reflected by a thickness $T_1$ that is less than thickness $T_0$ of FIG. 5A. This reduced thickness decreased the distance $D_1$ between the ferromagnetic material 306 and the magnet 304. Decreasing the distance between these magnetic elements increases the magnetic forces between the first and second portions 102 and 104.

Figure 6A:
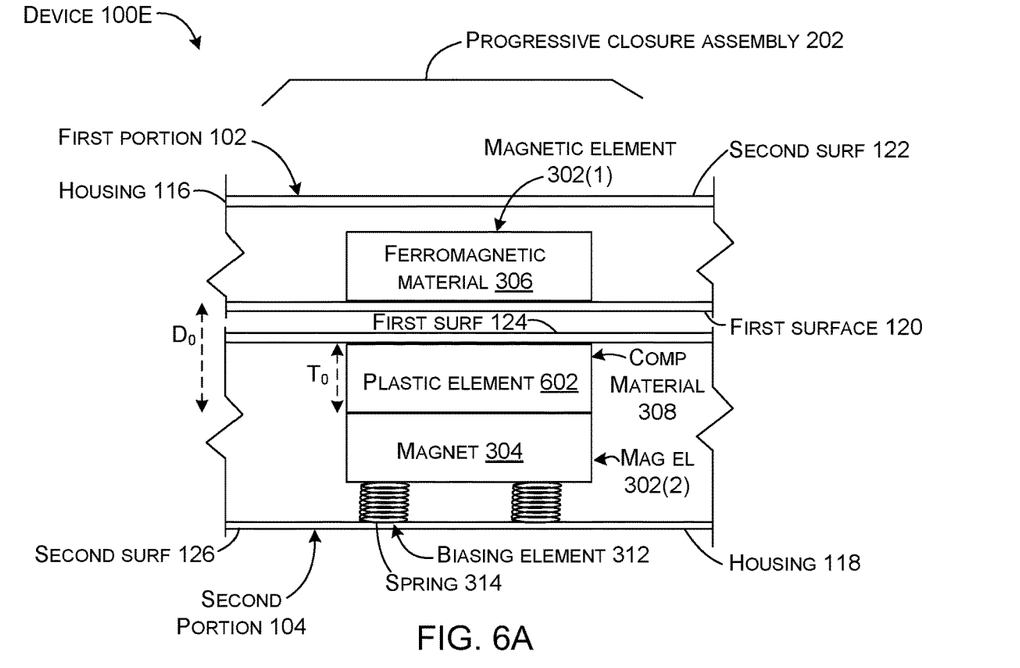
Figure 6B:
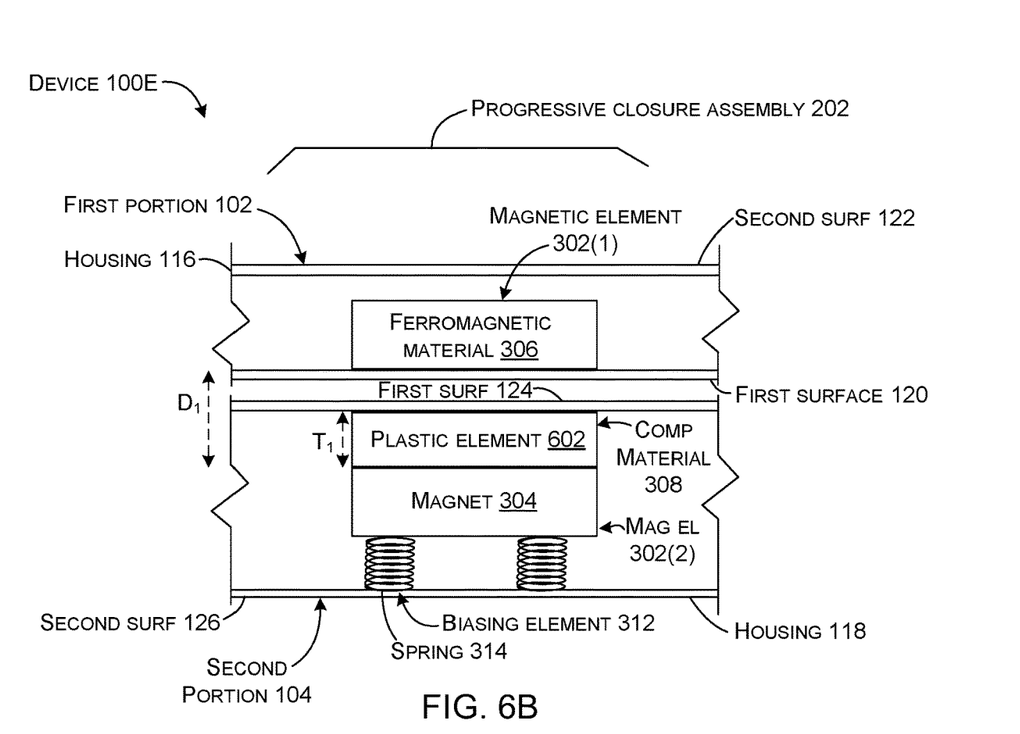

FIGS. 6A and 6B collectively show portions of another example device 100E. (The suffix 'E' relative to device 100E indicates that some aspects of this device 100E can be different from those of devices 100, 100A, 100B, 100C, and/or 100D described above relative to FIGS. 1A-5B. Elements introduced above relative to FIGS. 1A-5B are not re-introduced here for sake of brevity).

In this case, progressive closure assembly 202 can provide increasing magnetic closing forces as the device ages. In this example configuration, the progressive closure assembly 202 includes magnetic element 302(1) positioned in housing 116 proximate to the first surface 120 of the first portion 102. In this case, the magnetic element 302(1) is manifest as a ferromagnetic material 306. Magnetic element 302(2) is manifest as magnet 304 that is positioned in second portion 104.

The progressive closure assembly 202 includes a compressible material 308 that is manifest as a plastic element 602 and a biasing element 312 that is manifest as coil compression springs 314. In this example configuration, the plastic element 602 can be secured to the housing 118 proximate to the first surface 124. The plastic element 602 can also be secured to the magnet 304. The springs 314 can be compressed between the housing 118 (proximate to the second surface 126) and the magnet 304. The springs 314 can exert a biasing force on the plastic element 602 (e.g., compressing the plastic element 602 between the housing 118 and the magnet 304). In this configuration, the compressive force is imparted on the plastic element 602 regardless of the orientation of the first and second portions 102 and 104 (e.g. in both the open and closed orientations). The biasing force can produce compression of the plastic element 602 over time.

FIG. 6A shows the device 100E in a (near) new configuration where the plastic element 602 has a thickness $T_0$, which contributes to a distance $D_0$ between the ferromagnetic material 306 and the magnet 304 in the closed orientation.

FIG. 6B shows device 100E in the closed orientation at a subsequent point in the device's life. At this point, the biasing forces of the springs 314 and the magnetic attraction forces have contributed to compression of the plastic element 602 as reflected by a thickness $T_1$ that is less than thickness $T_0$ of FIG. 6A. This reduced thickness decreased the distance $D_1$ between the ferromagnetic material 306 and the magnet 304. Decreasing the distance between these magnetic elements increases the magnetic forces between the first and second portions 102 and 104. As mentioned above, the profile of the attractive magnetic forces can be designed to match some other aspect of the device 100. For instance, the 'strength' of the springs 314 can be selected to produce a relatively flatter or steeper change in the profile of the attractive magnetic forces as desired.

The present concepts can leverage the property of a compressible material, such as a solid foam, which tends to set over time to tune the magnet force over time by changing the distance between the magnetic elements of the first and second portions. These concepts have been explained in examples relating to closing forces used to keep a device from opening when the user closes it. The present concepts can be applied to other scenarios where a changing force profile is desired. One example is described directly below.

Some devices can employ a fang or protrusion extending from one device portion into a recess or receptacle of another device portion to selectively secure the device portions. Interaction of the fang and the recess can create friction forces. To secure the device portions together, the user has to overcome these friction forces to 'force' or push the portions together. Magnets can be used to counter these friction forces to make engagement easier. For instance, a magnet can be employed in one device portion and another magnet of opposite polar orientation can be employed in the second device portion. When the user desires to secure the device portions, attraction forces between the magnets can decrease the force the user has to exert (e.g., the magnets can help to counteract friction between the fang and the recess to facilitate engagement of the device portions).

When the user wants to separate the device portions, the user pulls the portions apart to overcome the magnetic forces. However, over the life of the device, friction between the fang and the recess tends to decrease. If the magnetic force remains constant as the device ages, then the user has to counter stronger magnetic forces than necessary. Incorporating a compressible material that causes the distance between the magnets to increase over the life of the device can cause the magnetic force to decrease in a manner that corresponds to the decreasing friction forces. Thus, the overall force required to engage and/or disengage the two device portions can remain generally consistent over the life of the device. As such, the present concepts can contribute to an enhanced user experience because user forces associated with engaging and/or disengaging the device portions can remain consistent over the life of the device.

The present concepts can be applied to any device where two portions are coupled by a mechanism that provides resistance to relative movement and the resistance changes over a life of the device. The progressive closure can employ magnetic elements that provide a force that counters the resistance. The progressive closure assembly can include a compressible material that compresses over the life to adjust the force in relation to the changing resistance.

Various examples are described above. Additional examples are described below. One example can entail a first portion and a second portion having hinge ends that are rotationally coupled by a hinge assembly so that the first and second portions can be rotated between an open orientation where the first and second portions are oriented away from one another to a closed orientation where the first portion is positioned against the second portion. The example can include a progressive closure assembly positioned on distal ends of the first and second portions, the progressive closure assembly comprising magnetic elements in both the first and second portions that provide a force to keep the first and second portions in the closed orientation and the force changes over a life of the device.

Another example can include any of the above and/or below examples where the force increases over the life.

Another example can include any of the above and/or below examples where a compressible material component is interposed between the magnetic elements.

Another example can include any of the above and/or below examples where the compressible material component compresses over the life thereby decreasing a distance between the magnetic elements in the closed orientation.

Another example can include any of the above and/or below examples where the compressible material component comprises a solid foam.

Another example can include any of the above and/or below examples where the magnetic elements comprise a first magnetic element on a housing of the first portion and a second magnetic element on a housing of the second portion, and where the compressible material is positioned between the second magnetic element and the housing of the second portion.

Another example can include any of the above and/or below examples where a biasing element applies a force on the second magnetic element toward the first magnetic element.

Another example can include any of the above and/or below examples where the biasing element comprises a compression spring.

Another example can include any of the above and/or below examples where one of the first and second magnetic elements comprises a magnet and the other of the first and second magnetic elements comprises a ferromagnetic material, or wherein each of the first and second magnetic elements comprises a magnet.

Another example can include any of the above and/or below examples where the force decreases over the life.

Another example can include any of the above and/or below examples where the magnetic elements comprise a first magnetic element positioned in the first portion and a second magnetic element positioned in the second portion and further comprising a compressible material component secured to an opposite side of the second magnetic element as the first magnetic element.

Another example can include any of the above and/or below examples where the compressible material component comprises a solid foam.

Another example can include any of the above and/or below examples where a biasing element creates a force on the second magnetic element and the compressible material component in a direction away from the first magnetic element.

Another example can include any of the above and/or below examples where the biasing element comprises a metal spring.

Another example can include a device that comprises a first portion and a second portion that are rotationally coupled by a hinge assembly so that the first and second portions can be rotated between an open orientation where the first and second portions are oriented away from one another to a closed orientation where the first portion is positioned against the second portion. The example can also include a progressive closure assembly comprising a first magnetic element positioned on the first portion and a second magnetic element positioned on the second portion, the progressive closure assembly further comprising a compressible solid foam positioned on the second portion between the first and second magnetic elements such that compression of the solid foam causes a magnetic force between the first and second magnetic elements in the closed orientation to increase over a life of the device.

Another example can include any of the above and/or below examples where the solid foam is positioned between and secured to a housing of the second portion and the second magnetic element.

Another example can include any of the above and/or below examples where a biasing element forces the second magnetic element against the solid foam.

Another example can include any of the above and/or below examples where the biasing element comprises a spring or a resilient material.

Another example can relate to a device that comprises a first portion and a second portion that are rotationally coupled by a hinge assembly so that the first and second portions can be rotated between an open orientation where the first and second portions are rotated away from one another to a closed orientation where the first portion is positioned against the second portion. The example can include a first magnetic element positioned on the first portion and a second magnetic element positioned on the second portion. The example can include a compressible solid foam secured to the second portion and to the second magnetic element on an opposite side from the first magnetic element such that compression of the solid foam pulls the second magnetic element away from the first magnetic element and causes a magnetic force between the first and second magnetic elements in the closed orientation to decrease.

Another example can include any of the above and/or below examples where a biasing element positioned between a housing of the second portion is proximate to the first portion and the second magnetic element.

Another example can include any of the above and/or below examples where the biasing element forces the second magnetic element away from the first portion to an extent defined by the compression of the solid foam.

Another example can relate to a device that comprises a first portion and a second portion that are selectively coupled by a mechanism that provides resistance to relative movement of the first and second portions, the resistance changing over a life of the device. The example can include a progressive closure assembly positioned on the first and second portions and comprising magnetic elements in both the first and second portions that provide a force that counters the resistance, the progressive closure assembly comprising a compressible material that compresses over the life to adjust the force in relation to the changing resistance.

The present concepts can be utilized with various types of devices, such as computing devices that can include, but are not limited to, notebook computers, tablet type computers, smart phones, wearable smart devices, gaming devices, entertainment consoles, and/or other developing or yet to be developed types of devices. As used herein, a computing device can be any type of device that has some amount of processing and/or storage capacity.

CONCLUSION

Although techniques, methods, devices, systems, etc., pertaining to force tuning are described in language specific to structural features and/or methodological acts, it is to be understood that the subject matter defined in the appended claims is not necessarily limited to the specific features or acts described. Rather, the specific features and acts are disclosed as example forms of implementing the claimed methods, devices, systems, etc.

The invention claimed is:

1. A device, comprising:
a first portion and a second portion having hinge ends that are rotationally coupled by a hinge assembly so that the first and second portions can be rotated between an open orientation where the first and second portions are oriented away from one another to a closed orientation where the first portion is positioned against the second portion; and,
a progressive closure assembly positioned on distal ends of the first and second portions, the progressive closure assembly comprising a first magnetic element in the first portion and a second magnetic element in the second portion that are configured to provide a force to keep the first and second portions in the closed orientation, the second magnetic element positioned between a spring and a compressible material in the second portion and the force configured to progressively decrease over a life of the device as the spring is configured to compress the compressible material and move the second magnet away from the first magnet in the closed orientation.

2. The device of claim 1, wherein the first magnetic element comprises a magnet and the second magnetic element comprises a ferromagnetic material or wherein the first magnetic element comprises a ferromagnetic material and the second magnetic element comprises a magnet.

3. The device of claim 1, wherein the compressible material comprises a solid foam.

4. The device of claim 1, wherein the spring comprises a coil spring or a leaf spring.

5. The device of claim 4, wherein the spring comprises a metal spring.

6. The device of claim 1, wherein the first magnetic element and the second magnetic element both comprise magnets.

7. The device of claim 1, wherein the spring has a relatively lower compression set than the compressible material.

8. The device of claim 7, wherein the spring comprises a metal spring and the compressible material comprises a solid foam.

9. The device of claim 8, wherein the second magnetic element is sandwiched in the second portion between the spring and the compressible material.

10. The device of claim 9, wherein an extent of movement of the second magnetic element is defined by an expanded thickness of the spring and a reduced thickness of the compressible material.

11. The device of claim 10, wherein the compressible material is secured to the second portion and the second magnetic element.

12. The device of claim 11, wherein a thickness of the compressible material is progressively decreased as the compressible material compresses responsive to a biasing force of the spring.

13. A device, comprising:
a first portion and a second portion that are rotationally coupled by a hinge assembly so that the first and second portions can be rotated between an open orientation where the first and second portions are rotated away from one another to a closed orientation where the first portion is positioned against the second portion;
a first magnetic element positioned on the first portion and a second magnetic element positioned on the second portion;
a biasing element positioned in the second portion proximate to the first portion and configured to bias the second magnetic element away from the first portion; and,
a compressible solid foam secured to the second portion and to the second magnetic element on an opposite side from the first magnetic element and the biasing element, the biasing element having a relatively low compression set compared to the compressible solid foam, and where progressive compression of the solid foam by the biasing element is configured to pull the second magnetic element away from the first magnetic element and increase a distance therebetween and cause a magnetic force between the first and second magnetic elements in the closed orientation to decrease at least in part due to increased distance.

14. The device of claim 13, wherein the biasing element comprises a resilient material or a spring.

15. The device of claim 13, wherein the first and second magnetic elements both comprise magnets or wherein one of the first and second magnetic elements comprises a magnet and the other of the first and second magnetic elements comprises a ferromagnetic material.

16. A device, comprising:
a first portion and a second portion configured to be positioned against one another;
a first magnetic element positioned in the first portion and a second magnetic element positioned in the second portion;
a biasing element positioned in the second portion between the second magnetic element and the first portion and configured to bias the second magnetic element away from the first magnetic element; and,
a compressible solid foam positioned in the second portion and secured to the second magnetic element opposite to the biasing element, the biasing element having a relatively lower compression set than the compressible solid foam, and where compression of the solid foam by the biasing element is configured to progressively increase a distance between the first magnetic element and the second magnetic element and cause a magnetic force between the first and second magnetic elements to progressively decrease at least in part due to the increased distance between the first magnetic element and the second magnetic element.

17. The device of claim 16, wherein the second portion comprises a housing that defines a first surface spaced apart from a second surface, and wherein the biasing element is positioned against the first surface and the compressible solid foam is positioned against the second surface, and wherein the second magnetic element is retained between the biasing element and the compressible solid foam.

18. The device of claim 17, wherein an extent of movement of the second magnetic element equals an extent of compression of a thickness of the compressible solid foam.

* * * * *